United States Patent
Benson et al.

(10) Patent No.: US 12,277,598 B2
(45) Date of Patent: Apr. 15, 2025

(54) DELEGATED DOCUMENT SCAN AND STORAGE

(71) Applicant: COUPA SOFTWARE INCORPORATED, San Mateo, CA (US)

(72) Inventors: Doug Benson, Burlingame, CA (US); Dan Benson, San Clemente, CA (US); Jeffrey Hellman, Albuquerque, NM (US)

(73) Assignee: Coupa Software Incorporated, San Mateo, CA (US)

( * ) Notice: Subject to any disclaimer, the term of this patent is extended or adjusted under 35 U.S.C. 154(b) by 143 days.

(21) Appl. No.: 18/163,104

(22) Filed: Feb. 1, 2023

(65) Prior Publication Data

US 2024/0257232 A1 Aug. 1, 2024

(51) Int. Cl.
G06Q 40/02 (2023.01)

(52) U.S. Cl.
CPC .................................. *G06Q 40/02* (2013.01)

(58) Field of Classification Search
None
See application file for complete search history.

(56) References Cited

U.S. PATENT DOCUMENTS

| | | | | |
|---|---|---|---|---|
| 2005/0222944 A1* | 10/2005 | Dodson, Jr. | ............ | G06Q 10/10 705/39 |
| 2008/0086355 A1* | 4/2008 | Bradley | ................ | G06Q 10/06 705/7.13 |
| 2008/0120240 A1 | 5/2008 | Ginter et al. | | |
| 2009/0119601 A1* | 5/2009 | Adachi | ................ | G06Q 10/10 715/753 |
| 2013/0085904 A1* | 4/2013 | Menon | ................... | G06Q 10/06 705/30 |
| 2013/0232041 A1* | 9/2013 | Nuggehalli | ............ | G06Q 40/10 705/30 |
| 2014/0095400 A1* | 4/2014 | Jackson | ............ | G06Q 10/1053 705/321 |
| 2014/0280962 A1* | 9/2014 | Schultz | ............... | H04L 67/1074 709/226 |
| 2015/0373089 A1* | 12/2015 | Koss | ..................... | H04W 12/08 709/205 |
| 2017/0289305 A1 | 10/2017 | Liensberger et al. | | |
| 2023/0179605 A1* | 6/2023 | Ali | .................... | H04W 12/0471 713/168 |
| 2024/0127240 A1* | 4/2024 | Abraham | ............. | G06Q 20/102 |

FOREIGN PATENT DOCUMENTS

CN 116542790 A * 8/2023

OTHER PUBLICATIONS

CN116542790 machine translation (Year: 2023).*

* cited by examiner

*Primary Examiner* — Paul S Schwarzenberg
(74) *Attorney, Agent, or Firm* — Baker Botts L.L.P.

(57) ABSTRACT

In one embodiment, the disclosure provides a machine-implemented technique that improves the traditional methods of expense reimbursement processes by allowing an authorized delegate, e.g., administrative assistant, that is acting on behalf of another, e.g., account owner, to add expense items through a device on which the delegate is logged-in to, as opposed to a device on which the account owner is logged-in to, all without requiring the delegate to manage multiple user accounts and in an automated fashion.

21 Claims, 10 Drawing Sheets

DELEGATED DOCUMENT SCAN AND STORAGE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Coupa Software Incorporated.

FIELD OF THE DISCLOSURE

One technical field of the present disclosure is computer-implemented machine learning algorithms applied to expense items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Large entities, such as large companies or other organizations, often procure goods and services through a procurement system. A procurement system allows large entities to procure items or services in bulk and/or through preferential contracts with goods and/or services providers. Through a procurement system, a large entity can specify preferred providers so that goods and/or services are obtained in an inexpensive and/or quality manner. Thus, it is often more beneficial for large entities to obtain goods or services through a procurement system than it would be to have individuals purchase similar goods or services and request reimbursement for the expenses afterward.

Unfortunately, despite utilizing procurement systems, many goods or services that could have been obtained through the procurement system are often obtained externally and submitted as expenses. While individual expenses may seem inconsequential, a large company that receives a large number of expense reimbursement requests can lose a lot in terms of quality of goods and/or services or cost when items are expensed instead of procured.

Individuals that incur repeated expenses commonly use administrative assistants to help process the expense receipts for reimbursement. Traditional methods used for this process are inefficient because, for example, the administrative assistant would have to scan and/or manually enter specifics of the expenses. Recent technological advances in mobile devices have provided many individuals with a readily accessible camera. In an ideal case, it would be helpful to leverage the readily accessible camera by allowing administrative assistants to capture/scan images of expense receipts that can be automatically and directly uploaded to the corresponding expense platform. However, no such platform exists yet, particularly none that would allow administrative assistants to upload directly to an expense report belonging to someone else's user account while using the assistants' own personal device to which they are logged-into with their user account.

Thus, there is a need for a system that allows a more efficient process for expenses. More specifically, there is a need for a system that allows administrative assistants to more easily enter expense items on behalf of the individual the assistants is supporting.

SUMMARY

The appended claims may serve as a summary of the disclosure.

BRIEF DESCRIPTION OF THE DRAWINGS

In the drawings:

Each of FIG. 2A, FIG. 2B.

FIG. 5 illustrates an example graphical user interface for displaying information relating to a delegated expense report.

FIG. 7 illustrates an example graphical user interface for displaying information relating to a delegated expense report.

DETAILED DESCRIPTION

Figure 1:
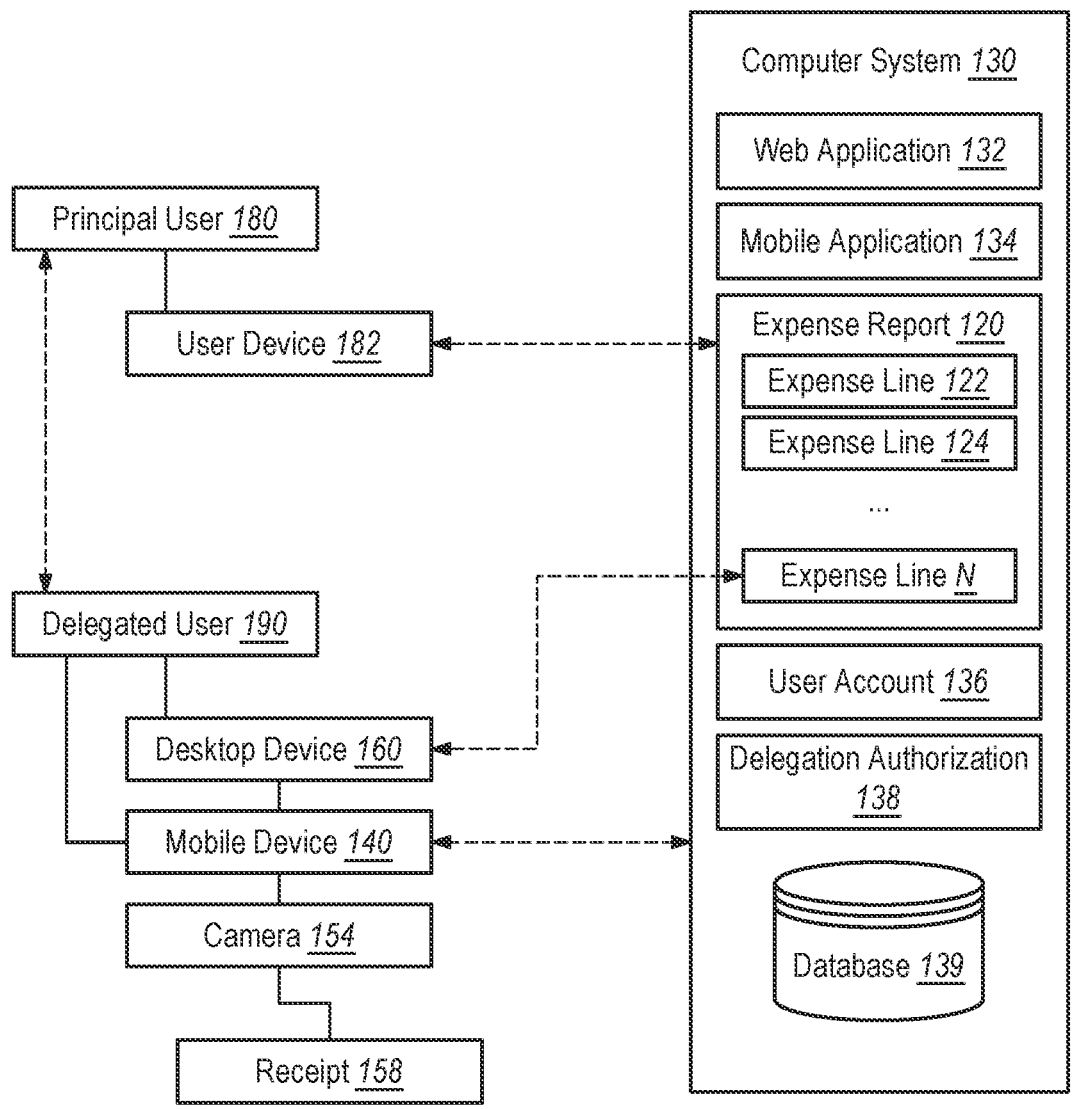
FIG. 1 is a block diagram of an example computer network system in which various embodiments may be practiced.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

In some embodiments, the disclosure provides systems and methods for improving a computer system to execute a technique that allows an authorized delegate that is acting on behalf of another to add expense items through a mobile device on which the delegate is logged-in to, as opposed a mobile device on which the account owner is logged-in to.

In one embodiment, the disclosure provides a machine-implemented technique that improves the traditional methods of expense reimbursement processes by allowing an authorized delegate (for example, administrative assistant) that is acting on behalf of another (for example, account owner) to add expense items through a device on which the delegate is logged-in to, as opposed to a device on which the account owner is logged-in to. Present expense processes are generally handled in a digital platform and require expense receipts and corresponding information to be uploaded/entered to the digital platform via an application (for example, a web application hosted on a desktop). Delegates or executive admins commonly spend a significant amount of time entering the details of physical receipts which may have been dumped on their desks in handfuls. This task is typically done on a desktop computer (for example, a computer used in a typical office, including a laptop). One of the problems with this approach is the inefficiencies involved in scanning the physical receipts, which may involve manually organizing the receipts, scanning the receipts one by one, downloading the scanned receipts, organizing the digital receipts, and uploading each one of the digital receipts to the appropriate expense line within the appropriate account, all on top of finding a working scanner. With the advancement of personal devices, cameras have become readily accessible, which could theoretically be used to upload expense receipts more conveniently than by using a scanner.

However, prior to the invention disclosed herein, there is yet an expense platform that allows a delegate to use their own personal devices and account to directly upload the scanned/captured receipts to the account held by another user of the platform. For instance, expense platforms typically require users to register a user account and further require the same user account to be logged-in to the platform using different applications, such as a web application or a mobile application. In a scenario where the delegate is preparing an expense report on behalf of the account owner on a web application, the traditional methods of expense processes do not allow the delegate to capture or scan receipts using their own personal devices to which the delegate's user account is logged-into. One workaround solution to this problem is having the account owner share his/her account ID and password to allow the delegate to log into the account owner's user account on the delegate's personal device, but that poses a security risk. Another issue with this approach is the inefficiencies involving the delegate having to manage multiple user accounts and the constant switching of user accounts on the delegate's own personal device (for example, between the delegate's own user account and one or more other user accounts that have provided authorization to the delegate's user account).

As a solution to the above-discussed issues, the disclosure herein provides a novel technique for uploading an expense item (for example, a receipt) to an expense platform using both a web application and a mobile application. More specifically, the novel technique disclosed herein allows users to prepare and manage expense reports on a web application hosted on, for example, a desktop computer, while further allowing the users to upload, from a mobile application hosted on their personal devices, images of expense receipts directly on to the expense platform and subsequently displayed on the web application. Improving on this technique, the disclosure herein further provides another novel technique that allows an authorized delegate (for example, administrative assistant) that is acting on behalf of another (for example, account owner/holder) to add expense items through a mobile device hosting a mobile application on which the delegate is logged-in to, as opposed to the account owner's user account. In other words, disclosed techniques further allow authorized delegates to add the expense items through their mobile device without having to change any of the phone application settings (e.g., without logging out or switching user accounts), and thereafter the expense item is automatically routed to the proper expense line of the expense report belonging to a user account that is different than the delegate's own user account. One of the critical aspects of the disclosed techniques is based on a streamlined approach in automating many of the processes while reducing/removing any processes that are cumbersome, or otherwise burdensome in promoting an efficient, streamlined workflow. For example, the disclosed techniques allow a delegate user that is working on behalf of another and working on a desktop computer to cause a notification to appear on the delegate's personal device, to which the delegate's user account is logged into (i.e., logged-in to the appropriate application running on their personal device). Then, when the delegate interacts with that notification and completes the document scan, the processes disclosed herein is configured to allow the scanned document to be routed back, automatically, to the appropriate expense line belonging to the account owner rather than those belonging to the delegate's user account.

A person of ordinary skill in the art would recognize that the combination of these processes streamlines the expense reimbursement processes beyond what was possible before, and the practical application of these processes further enable those practicing the disclosed techniques to achieve far beyond what was achievable before, in part, due to the increased efficiency.

Unless noted otherwise herein, any references to the term "scan" may be interchangeable with the term "capture" within this disclosure.

Unless noted otherwise herein, any references to the term "expense report" may be interchangeable with the term "expense record" within this disclosure.

While the embodiments herein are disclosed with references to the concept of expenses, the embodiments are not limited to only those directed to the concept of expenses, and can cover any scenarios where images or files are to be captured by a delegate's personal device in a fashion described herein. For example, any references to the concept of an expense as described herein can be interchangeable with the concept of invoices, such as where an authorized delegate may employ the techniques disclosed herein to use their personal devices to capture and automatically upload files or images pertaining to invoices to a platform hosted in a server. In another example, the delegated functions described herein may be employed to allow a delegate to provide photographic proof, on behalf of another, that a particular item has been received, or that a particular service has been performed.

Structural Overview

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system comprises a computer system 130 which is communicatively coupled directly or indirectly via one or more networks, through which the computer system 130 may communicate with external devices such as user device 182, desktop device 160, and/or mobile device 140. The computer system 130 and other elements of the system may each comprise an interface compatible with the one or more networks and are programmed or configured to use standardized protocols for communication across the networks such as TCP/IP, Bluetooth, and higher-layer protocols such as HTTP, TLS, and the like.

The computer system 130 may be implemented using a server-class computer or other computers having one or more processor cores, co-processors, or other computers. The computer system 130 may be a physical server computer and/or a virtual server instance stored in a data center, such as through cloud computing.

In an embodiment, the computer system 130 is configured with a framework necessary to process and maintain expense reports of numerous user accounts.

The computer system 130 comprises data and/or computer instructions corresponding to web application 132, mobile application 134, expense reports 120, user accounts 136, delegation authorization 138, and additional authentication instructions 138. The computer system 130 may further comprise a database 139 that is used to store data used by the computer system 130. Computer-executable instructions described herein may be in machine-executable code in the instruction set of a CPU and may have been compiled based upon source code written in JAVA, C, C++, OBJECTIVE-C, or any other programming language or environment, alone or in combination with scripts in JAVASCRIPT, other scripting languages, and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the computer system 130. While FIG. 1 depicts the data, records, and/or information being stored in the database 139 of the computer system 130, the data, records, and/or information may be stored in an external system, such as an external physical server and/or cloud server, and accessed by the computer system 130.

In an embodiment, the computer system 130 executes a web application 132. The web application 132 may comprise computer-readable instructions which are used to manage or process expense reports for various user accounts configured with the computer system 130. The web application 132 may be executed using a web browser hosted on a device, such as a desktop computer (for example, a computer used in a typical office, including a laptop). In some embodiments, the web application 132 may be executed using a web browser hosted on mobile devices.

In an embodiment, the computer system 130 executes a mobile application 134. Similar to the web application 134, the mobile application 134 may comprise computer-readable instructions which are used to manage or process expense reports for various user accounts configured with the computer system 130. The mobile application 134 may be a native application that is hosted on a device, such as a mobile device (for example, an application that is designed to run on such devices, that is, not through a web browser). In some embodiments, the mobile application 134 may be a native application that is hosted on a desktop computer. The term native application used herein refers to an application that is configured and/or designed to be hosted on a particular device.

In an embodiment, the computer system 130 may be configured to allow a particular expense report associated with a particular user account to be accessible by either a web application or a mobile application. In another embodiment, the computer system 130 may be configured to allow an expense report to be accessible by both the web application and mobile application in a concurrent fashion, such that any modifications to the expense report made on either the web application or the mobile application will be reflected in the other application.

In an embodiment, the computer system 130 comprises data and/or computer instructions corresponding to expense reports 120. Expense reports described herein refer to a report that is created to compile expense items (or expense lines) for the account owner, which when appropriately prepared and thereafter submitted, one or more approvers will evaluate the report and either grant or deny reimbursement of the expense items. The expense report may be partially granted, such that only some of the expense lines are reimbursed. FIG. 1 illustrates a single expense report 120 comprising multiple expense lines 122, 124, . . . N. However, in practice, the computer system 130 may comprise multiple expense reports 120, each expense report being associated with a particular user account.

In an embodiment, the computer system 130 comprises data and/or computer instructions corresponding to user accounts 136. FIG. 1 illustrates a single user account, however, in practice, the computer system 130 may comprise multiple user accounts 136, and each user account is associated with a particular user and with one or more expense reports. The disclosure herein may use the term "account owner" to indicate a user that is registered as the owner or otherwise controls a particular user account. In an embodiment, only the account owner of a user account may hold the privilege to create, access, prepare, administer, modify, and/or submit for approval the expense report, unless the account owner provides authorization to another user account.

In an embodiment, the computer system 130 comprises data and/or computer instructions corresponding to delegation authorization 138. The delegation authorization data 138 comprises one or more records defining a delegation relationship between one particular user account and another, or the particular user and a group of user accounts. For example, the computer system 130 may store data identifying one or more delegate user accounts that are authorized by an account owner to act on behalf of the account owner to create, access, prepare, administer, modify, and/or submit for approval an expense report of the account owner. In an embodiment, the delegate user account's access to the account owner's user account may be limited, such that only the necessary privilege to create, access, prepare, administer, modify, and/or submit for approval an expense report may be provided to the delegate user account. For example, even if a user account is provided delegate authorization, the delegate user account may not be provided general access to the account owner's user account (for example, cannot log-in to the account owner's user account, including through a web application or a mobile application). Instead, the computer system 130 may be configured to require the delegate user to log-into his/her own user account, and computer system 130 may further provide necessary privileges to delegate to handle expense processes for the account owner without providing access to the account owner's user account.

The computer system 130 is accessible over a network by multiple computing devices, such as user device 182, desktop device 160, and/or mobile device 140. Although FIG. 1 depicts only one computing device per entity, any number of other computing devices may be registered with the computer system 130 at any given time. Thus, the elements in FIG. 1 are intended to represent one workable embodiment but are not intended to constrain or limit the number of elements that could be used in other embodiments. In an embodiment, each of the user device 182, desktop device 160, and mobile device 140 may comprise a plurality of computing devices that are restricted to only users from a single entity that is logged-in to the computer system 130 via web application 132 or mobile application 134. In other words, although more than one computer may be used, only verified users (or authorized delegate user accounts) of a single entity may access specific transaction records stored in the computer system 130 from these computers. Any applicable means of restricting unauthorized users from accessing specific records and/or information stored on the computer system 130 may be used (for example, password and username, two-step authentication, one-time password, biometric authentication, etc.).

The computing devices such as the user device 182, desktop device 160, and/or mobile device 140 may comprise computers that include hardware capable of communicatively coupling the computers to one or more server computers, such as the computer system 130 over one or more service providers. For example, user device 182, desktop device 160, and/or mobile device 140 may include a network card that communicates with server computer 102 through home or office wireless routers (not illustrated in FIG. 1) coupled with an internet service provider. The user device 182, desktop device 160, and/or mobile device 140 may be any of smartphones, personal computers, tablet computing devices, PDAs, laptops, or any other computing devices capable of transmitting and receiving information and performing the functions described herein.

One or more networks (not shown) may be implemented by any medium or mechanism that provides for the exchange of data between the various elements of FIG. 1. Examples of the one or more networks include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. The one or more networks may comprise one or more local area networks, wide area networks, and/or internetworks. The various elements of FIG. 1 may also have direct (wired or wireless) communication links, depending upon a particular implementation.

Technique for Scanning Expense Items Via Mobile Device

Figure 2A:
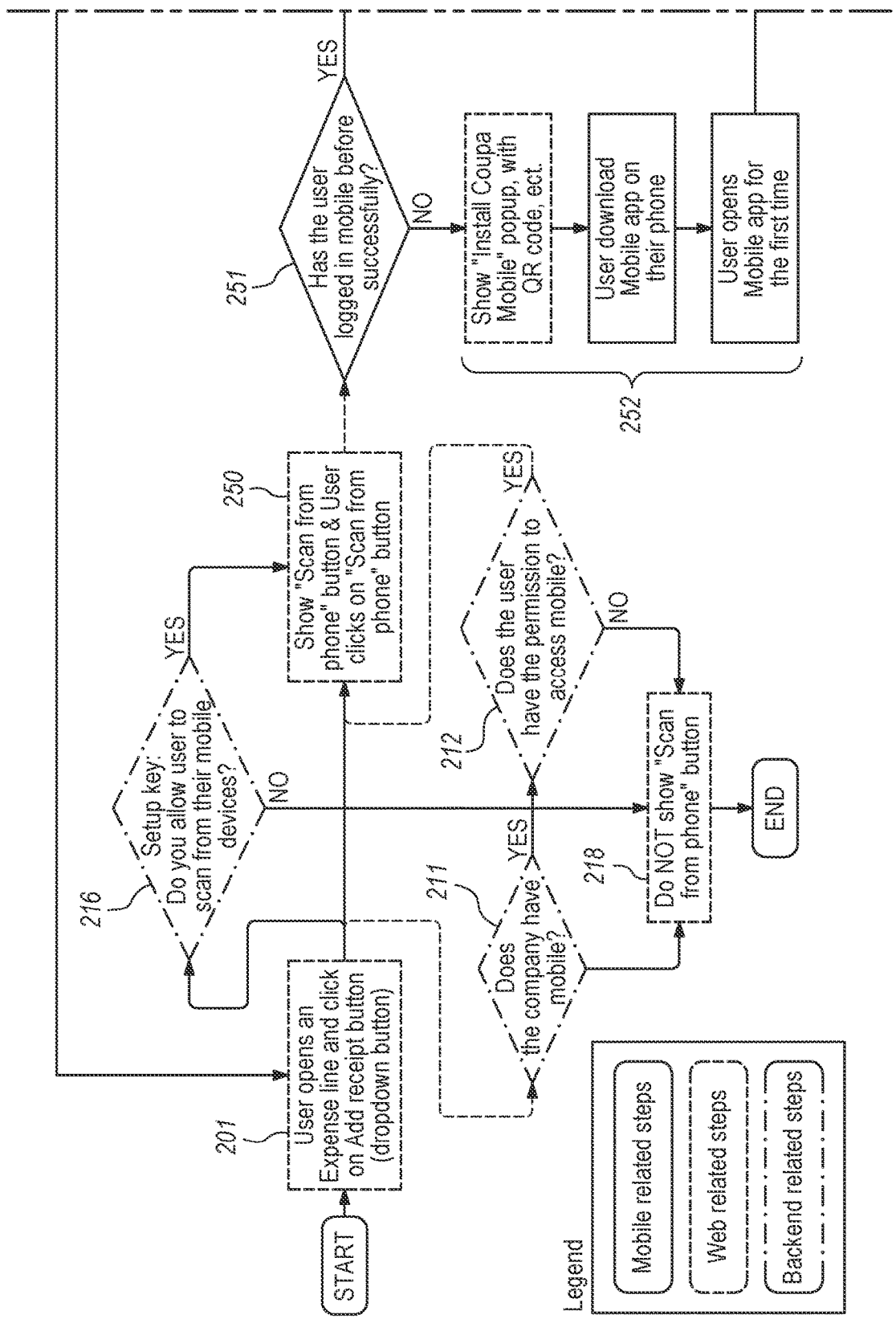
FIG. 2C is a flow diagram depicting an example method for uploading images of receipts using a mobile application hosted on a mobile application onto a computer system and further using a corresponding web application.
Figure 2B:
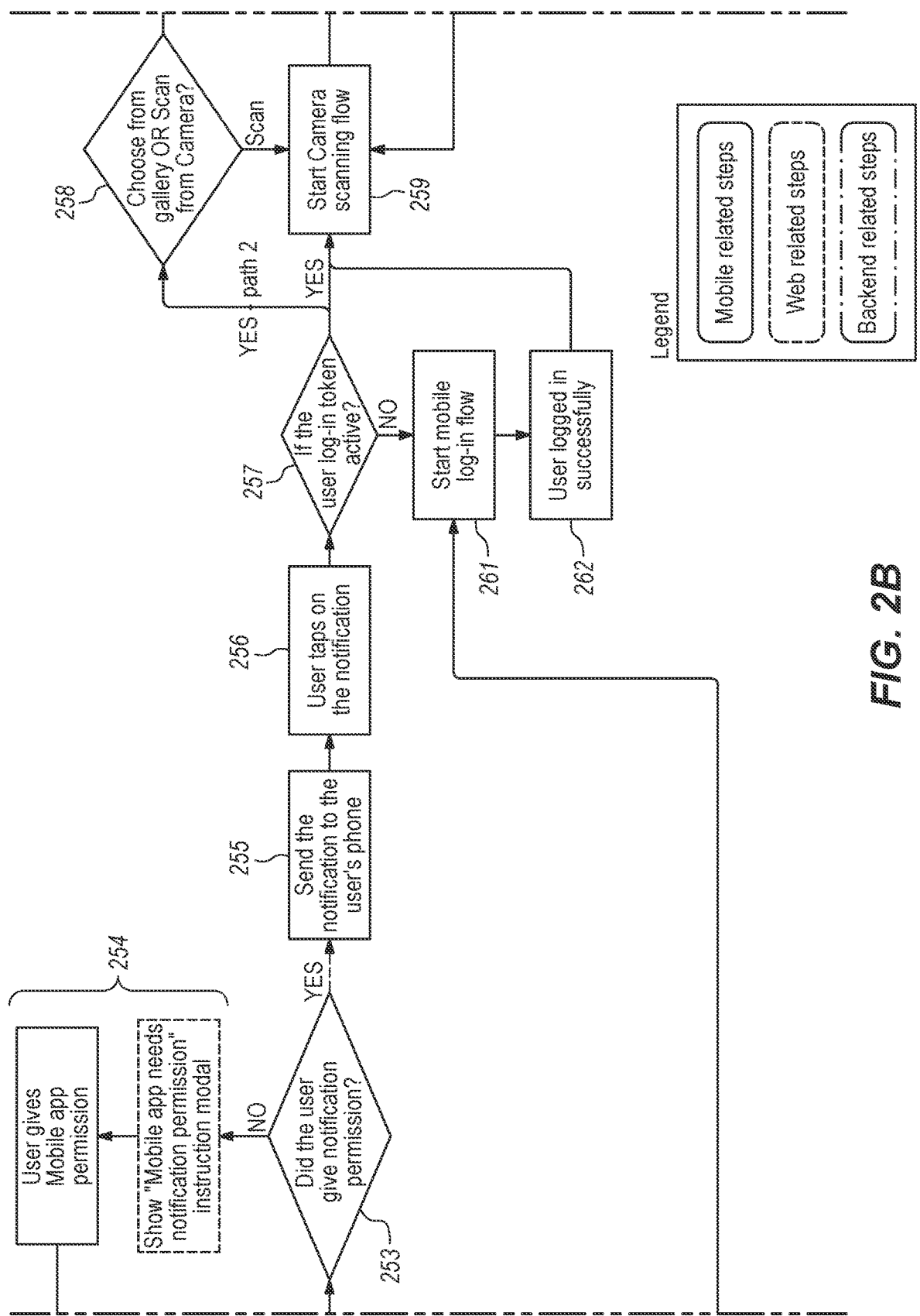
Figure 2C:
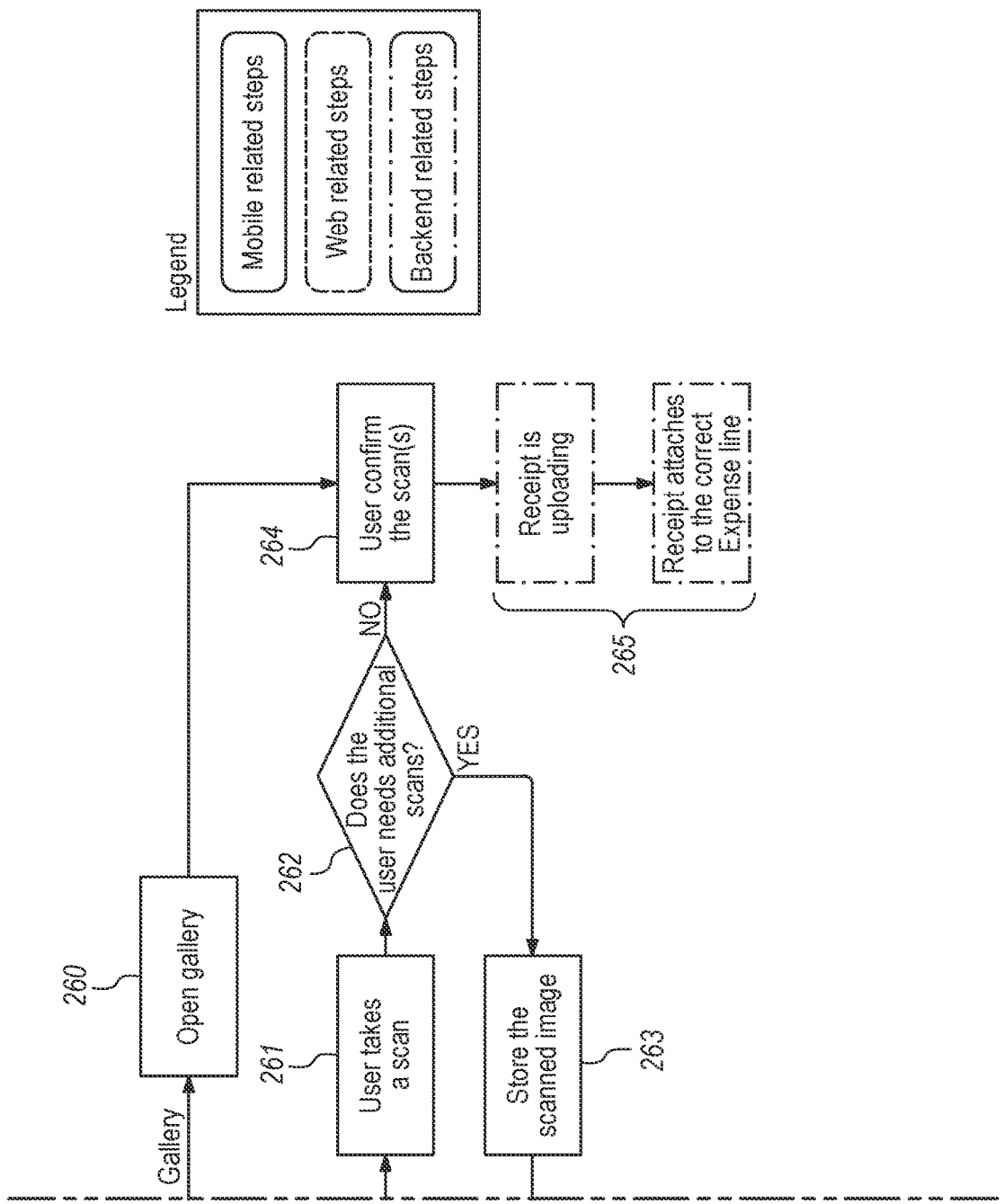

Each of FIG. 2A, FIG. 2B, FIG. 2C is a flow diagram depicting an example method for uploading an expense item (for example, a receipt) to an expense platform using both a web application and a mobile application hosted on, for example, a mobile device. More specifically, the example method disclosed herein allows expense reports to be prepared/managed on a web application while further allowing images of expense receipts to be uploaded directly from a mobile application onto the expense platform and displayed on the web application. For the purpose of describing the techniques in these figures, and for this purpose without limitation, it is assumed that references to the web application 132 refer to a web application hosted on a desktop computer 160 shown in FIG. 1 and references to the mobile application 134 refers to a mobile application hosted on a personal mobile device, such as a smartphone. However, either or both the web application or the mobile application may be hosted on any kind of device suitable for executing expense processes.

Each of FIG. 2A, FIG. 2B, FIG. 2C illustrates a legend indicating that steps shown inside a boundary of solid lines are related to the mobile application, steps shown inside a boundary of dash lines are related to the web application, and steps shown inside a boundary of dash-dot lines are related to backend processes. In one embodiment, the mobile-related steps are those performed by a mobile device, and web-related and backend-related steps are those performed by a computer system 130. In another embodiment, all steps may be performed by the computer system 130, including the mobile-related steps, however, the computer system 130 may be programmed to delegate or otherwise instruct other devices (for example, mobile device and/or mobile application) to perform the method steps shown in the figures. In another embodiment, the web-related steps may be performed by a desktop computer typically used in an office or residential areas. As exemplified by these embodiments, although FIG. 2A, FIG. 2B, FIG. 2C illustrate the division of processes between mobile, web, and back-end-related steps, each of such, or any combination thereof, may be performed by the computer system 130, mobile device, mobile application, desktop device, and web application. Similarly, while the disclosure below may reference the computer system 130 performing certain steps, the disclosure is simply intended to describe exemplary embodiments of the invention and is not intended to be limited to only the computer system 130 performing the steps (for example, may also be performed by the mobile device/application and/or web application).

The example method starts at step 201. At the start of the method, a user may be logged-in to a web application. Step 201 continues when the user selects an expense line within a particular expense report and clicks on an "Add" button. At the end of step 201, two processes may begin, i.e., steps 211 and 216. Steps 211-212 and 216 may be executed in parallel or in sequence and in any order. Embodiments as shown in FIG. 2A, FIG. 2B, FIG. 2C are those where the account owner is logged-into the web application. Embodiments directed to a delegate user account are described further below with reference to FIG. 3, FIG. 4, FIG. 5, FIG. 6, FIG. 7. Notably, however, given the similar aspects of the embodiments of FIG. 2A, FIG. 2B, FIG. 2C and the embodiments of FIG. 3, FIG. 4, FIG. 5, FIG. 6, FIG. 7, the disclosures corresponding to both sets of embodiments are interchangeable and are applicable to other, unless otherwise noted, for example, when the disclosure discusses the distinguishing features of the two sets of embodiments.

At step 211, the computer system 130 may be programmed to access user account information 136 of the user and determine whether the user account is associated with a mobile device that has been registered in the system. If not, the method proceeds to step 218 and terminates, in accordance with the illustration of FIG. 2A.

At step 212, the computer system 130 may be programmed to access the user account information 136 and determine whether the user account has been authorized to use the mobile application on the mobile device. If not, the method proceeds to step 218 and terminates, in accordance with the illustration of FIG. 2A.

At step 216, the computer system 130 may be programmed to access the user account information 136 and determine whether the user account has been authorized to upload an image (for example, a receipt) from mobile devices. If not, the method proceeds to step 218 and terminates, in accordance with the illustration of FIG. 2A.

Figure 3:
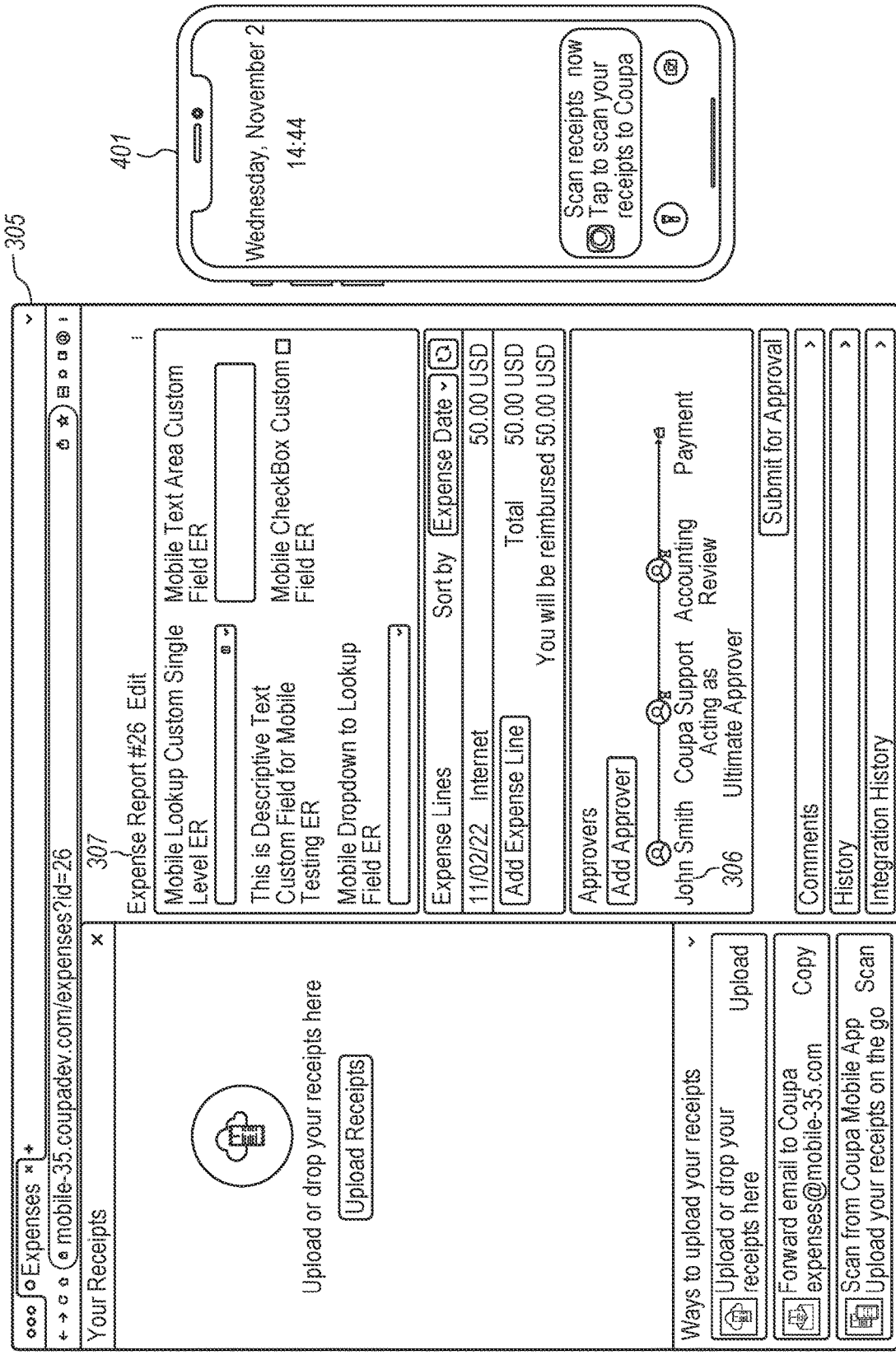
FIG. 3 illustrates an example graphical user interface for displaying information relating to a delegated expense report.

At step 250, after determining that the user account is authorized in accordance with steps 211, 212, and 216, the computer system 130 may be programmed to cause the web application to display one or more methods of uploading one or more receipts. For example, FIG. 3 illustrates prompt 313 where a user is provided a choice of uploading a receipt by (1) uploading the receipt directly onto the web application, (2) emailing the receipt to an email address associated with the computer system 130, or (3) uploading the receipt from a mobile application. If the web application receives a selection of uploading the receipt from a mobile application hosted on a mobile device, then the method proceeds to step 251.

At step 251, the computer system 130 may be programmed to determine whether the user account has previously logged-in to the mobile application on the mobile device at a prior time. The steps of making this determination may be executed by the mobile application, and the result of such determination may be communicated to the compute system 130. If the user account has not logged-in to the mobile application previously, the method may progress to the set of steps 252 where the mobile device is programmed to initiate a sequence of steps that prompts the user to download, install, and/or open the mobile application on the mobile device.

At step 253, the computer system 130 may be programmed to determine whether the mobile application has been authorized to provide notification messages on the mobile device authorized, such that when the computer system 130 instructs the mobile application to prompt a notification message on the mobile device, the notification message may be shown. If the mobile application has not been granted such authorization, the method may progress to the set of steps 254.

At steps 254, the computer system 130 may be programmed to request the mobile device to prompt a message to enable the mobile application to display notification messages on a display associated with the mobile device, or alternatively implement other methods of notifications such as sound, vibrations, tactile feedback, or notification message via email. If the requested permission is obtained in accordance with step 254, the method may start over at step 201.

At step 255, the computer system 130 may be programmed to send a notification message to the mobile device. The mobile device may be programmed to display the notification message on its display or otherwise provide notification to a user using different methods of notification.

At steps 256 and 257, the computer system 130 may be programmed to, upon determining that the user has interacted with the notification message, further determine whether the user log-in token is active, for example, whether the user is currently logged-in to the mobile application and/or the web application. If the user log-in token is active, in one embodiment, the method continues to step 258, and in another embodiment, the method continues to step 259.

If the computer system 130 determines that the user log-in token is not active, at step 261, the computer system 130 may programmatically instruct the mobile application to initiate a mobile log-in flow by which the user is requested to log in to the mobile application. At step 262, if the user successfully logs in, the method continues to step 258 in one embodiment and step 259 in another embodiment.

At step 258, according to an embodiment, the computer system 130 may be programmed to instruct the mobile device/application to display a prompt message (for example, to a user) for an option of choosing an image from a gallery of the mobile device or scanning or capturing an image using a camera associated with the mobile device. An example camera may be one that is built-in to the mobile device or another camera that is connected (wired or wirelessly) to the mobile device. Alternative to a camera, a scanner may also be used to scan/capture an image. An example image is a purchase receipt or other documents showing proof of purchase. While embodiments herein may reference an image to describe the disclosed techniques, an image is only provided as an example data format, and other data format is compatible, including any data, information, file, and/or attachment stored on a computing device used by the delegate. In particular embodiments, the mobile application may be programmed to facilitate an image capture flow by automatically detecting when the camera is viewing a receipt (or other document) and captures the image without user input. When an image is captured, the mobile application may be programmed to prompt the user to confirm or reject the auto-captured image. In particular embodiments, the mobile application may be programmed to automatically improve the readability of the captured image by deskewing and/or straightening the image.

The user does need to confirm or reject the auto captured image as described. If rejected, the image is never uploaded to the Coupa server and the camera scan process starts over so the user may capture a better image.

At step 259, according to an embodiment, the computer system 130 may be programmed to instruct the mobile device/application, and the mobile device/application may initiate a camera scanning flow.

At step 260, the computer system 130 may be programmed to instruct the mobile device/application to, and the mobile device/application may, access an data repository (for example, an image gallery) on which one or more images may be selected by a user to be uploaded to a database associated with the computer system 130.

At steps 261 and 262, the computer system 130 may be programmed to instruct the mobile device/application to, and the mobile device/application may capture an image, or scan an image, then determine whether an additional image needs to be scanned/captured, for example, based on user feedback. If an additional image needs to be scanned/captured, at step 263, the mobile device/application may be programmed to store the captured/scanned image and the method may continue back at step 259.

At step 264, the computer system 130 may be programmed to determine whether the user has finished scanning/capturing all images, for example, by requesting the user to confirm that no additional scans/captures are needed via a selection of a button/prompt.

At step 265, the computer system 130 may be programmed to receive the images and store the images to a database associated with the computer system 130. Then, the computer system 130 may be programmed to attach the images to a particular expense line of an expense report, for example, the particular expense line selected by a user in step 201. In an embodiment, the computer system 130 may be programmed to perform an analysis of the images, extract information from the images, and attach the information to the expense line. In some embodiments, in a circumstance where an expense line has not been selected in step 201, the computer system 130 may be programmed to use the extracted information to automatically attach the images and the extracted information to a particular expense line(s) in the expense report. Or alternatively, the computer system 130 may be programmed to receive the images and store the images in a folder that is associated with the corresponding user account.

In an embodiment, once the receipt has been attached to the correct expense line, the computer system 130 may be programmed to refresh the web application to show a preview of the image and/or additional details that have been extracted from the images. In some embodiments, the computer system 130 may be programmed to send a prompt to either the web application or the mobile application that requests the user to confirm whether the images have been attached to the correct expense line or whether the extracted information is accurate.

Technique for Scanning Expenses Via Delegate's Mobile Device

FIGS. 3-7 illustrate another novel technique that is built on top of the technique described above with reference to FIGS. 2A-2C. The embodiments illustrated in FIGS. 3-7 are substantially similar to those shown in FIGS. 2A-2C, but are different in that the embodiments in FIGS. 3-7 disclose a technique that allows an authorized delegate (for example, administrative assistant) that is acting on behalf of another (for example, account owner/holder) to add expense items through a mobile device on which the delegate is logged-in to, as opposed a mobile device on which the account owner is logged-in to. The disclosure with respect to FIGS. 3-7 and disclosure above with respect to FIGS. 2A-2C are compatible with each other, such that portions of one disclosure may be incorporated with the other unless stated otherwise.

Traditional methods for delegate expense reports do not support scanning/capturing images of receipts on a mobile device using the delegate's own user account. One known workaround solution to this problem is for the account owner to share their account identifier and corresponding password with the delegate to allow the delegate to log into the account owner's user account on the delegate's personal device. This workaround solution, however, poses many issues because it would require the delegate to juggle multiple user accounts on his/her personal device, particularly if the delegate has been authorized to prepare expense reports for multiple accounts. More specific issues with the workaround solutions include, for example:

Limited storage: Mobile devices often have limited storage space, and storing different sets of data for different users can quickly fill up the device's storage.

Switching between accounts: The process of switching between user accounts on a mobile device can be cumbersome, as it often requires logging out of one account and logging into another.

Syncing issues: If the device is connected to multiple accounts, it can become difficult to keep the data synced across all accounts, in particular, if the delegate is authorized to handle multiple other user accounts, it can be extremely difficult to make sure the uploaded files/images are routed to the correct account.

Security: It can be challenging to ensure that each user's data and settings are kept separate and secure, particularly if the delegate is provided with the account owner's account/password information.

App-specific: some apps do not support multiple accounts, so it can be difficult to use the same app with different accounts on the same device.

UI/UX: Some devices and apps may not have a good user interface for managing multiple accounts and switching between them, making it difficult for users to understand and use the feature.

Moreover, if an account owner (e.g., executive or government leader) has multiple delegates and each delegate is authorized to handle one portion of the account owner's needs, some of which relating to sensitive information, then security may become an issue if accessibility of information is not appropriately limited to the delegates. The techniques disclosed herein allow those multiple delegates to do their work and submit expenses or other documents that route properly without exposing sensitive data to other delegates.

The delegate expense report technique disclosed herein provides technical and practical improvements to the inefficient workaround solution described above by providing a novel way of allowing a delegate to use their own mobile device while still logged-in to his/her user account on a mobile application and capture/scan images of receipts. Then, the computer system 130 may be configured to automatically attach the uploaded images to a particular expense report belonging to the account owner, the results of which may be shown on a web application where the delegate user is preparing the expense report.

Each of FIG. 3, FIG. 4, FIG. 5, FIG. 6, FIG. 7 illustrates an example of the delegate expense report technique through example depictions of graphical user interfaces of a web application 305 and a mobile device 401 on which a mobile application may be hosted. The example graphical user interfaces are shown side-by-side, where the interface for the web application is shown on the left and the interface for the mobile device is shown on the right. In these figures, it is assumed that the delegate user account is logged-into the web application. The delegate user account is a user account that has been authorized as a delegate of another user account, such that the delegate user is authorized prepare an expense report on behalf of that user account (account owner). For example, FIG. 3 illustrates an instance of a web application to which a delegate user account is logged-into and further illustrates an expense report—Expense Report #26 (element 307)—that is owned by an account owner, whose name is shown as "John Smith" 306.

In an embodiment, when an expense report is filled out and submitted for approval, the computer system 130 may require the expense report to be reviewed and approved by several others. In FIG. 3, examples of such others are shown as "John Smith" (for example, account owner), "Coupa Support Acting as Ultimate Approver" (for example, account owner's manager), and "Accounting Review" (for example, an individual from the accounting department). In an embodiment, each of the approvers may selectively approve a particular expense line within the expense report, that is, while rejecting some of the expense items. If the submitted expense report is approved by all required approvers, the computer system 130 may be programmed to automatically provide reimbursement for the approved expense items. The terms "expense items" and "expense lines" as used herein are interchangeable.

In an embodiment, the computer system 130 may be programmed to cause the web application 305 to display one or more methods of uploading one or more receipts. For example, FIG. 3 illustrates a prompt 313 where a user is provided a choice of uploading an image of a receipt by (1) uploading the receipt directly onto the web application, (2) emailing the receipt to an email address associated with the computer system 130, or (3) uploading the receipt from a mobile application. The uploading option may be used to upload images that are stored on a desktop computer on which the web application is hosted. The email option may be used to provide computer system 130 with images by sending an email message to an email address associated with computer system 130, where the images are sent via email attachments. The third option involves uploading images of receipts via a mobile application that is separate from the web application.

Figure 4:
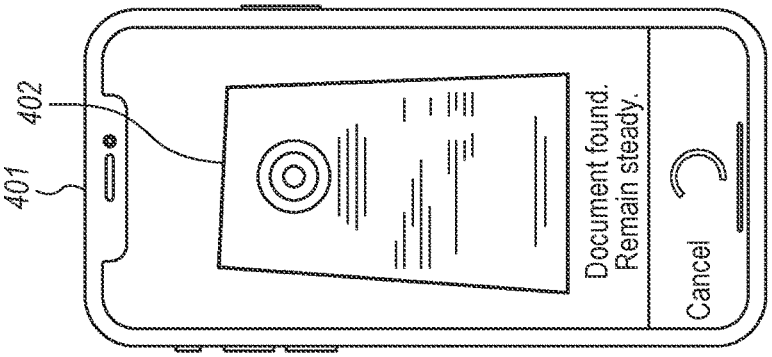
FIG. 4 illustrates an example graphical user interface for displaying information relating to a delegated expense report.

In an embodiment, where the user selects the option of uploading images of receipts from a mobile application, the computer system 130 may be programmed to instruct the mobile device/application to display a notification message, and upon user interaction, initiate the uploading process. In an embodiment, upon user interaction, the mobile device 401 may automatically provide access to a camera, allowing the user to scan or capture an image of a receipt. For example, FIG. 4 illustrates the display of the mobile phone 401 on which the image-capturing process is shown, in particular, where the mobile phone's camera is being used to capture an image of a receipt 402. In some embodiments, images of receipts may be uploaded to the computer system 130 by allowing a user to select images previously stored on the camera, for example, from the mobile device's gallery. An example of a camera as disclosed herein may be a camera that is built-in to the mobile device or another camera that is connected to the mobile device (for example, wired or wirelessly). Alternative to a camera, a scanner may also be used to scan or capture an image. An example of an image as disclosed herein is a receipt or other documents showing proof of purchase. In an embodiment, images may be captured using the mobile device's native camera application or using the camera function of the mobile application. In other embodiments, images may be captured using a third-party application, and the mobile application may be provided access to the captured images.

Figure 5:
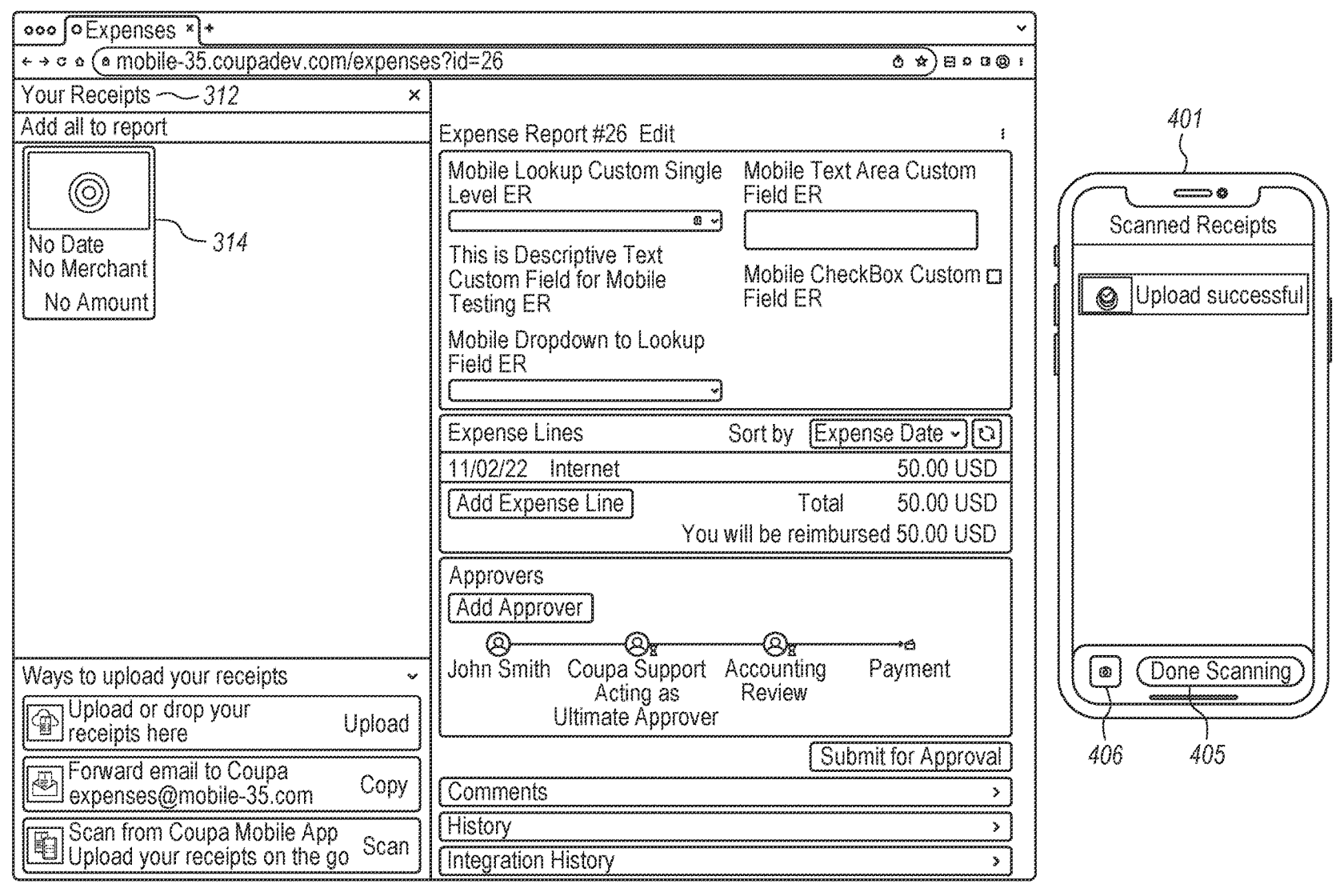

In an embodiment, once an image of a receipt has been captured, the mobile device (and/or the mobile application) may be programmed to determine whether additional images are to be captured. This determination may involve the mobile application prompting a notification message that requests a user to select between capturing additional images or confirming that the images have all been captured. For example, FIG. 5 illustrates a button 406 on the graphical user interface, which when selected, enables the camera to capture an additional image, and a "Done Scanning" button on the graphical user interface, which when selected initiates the uploading process where the capture images are transmitted to the computer system 130.

Figure 6:
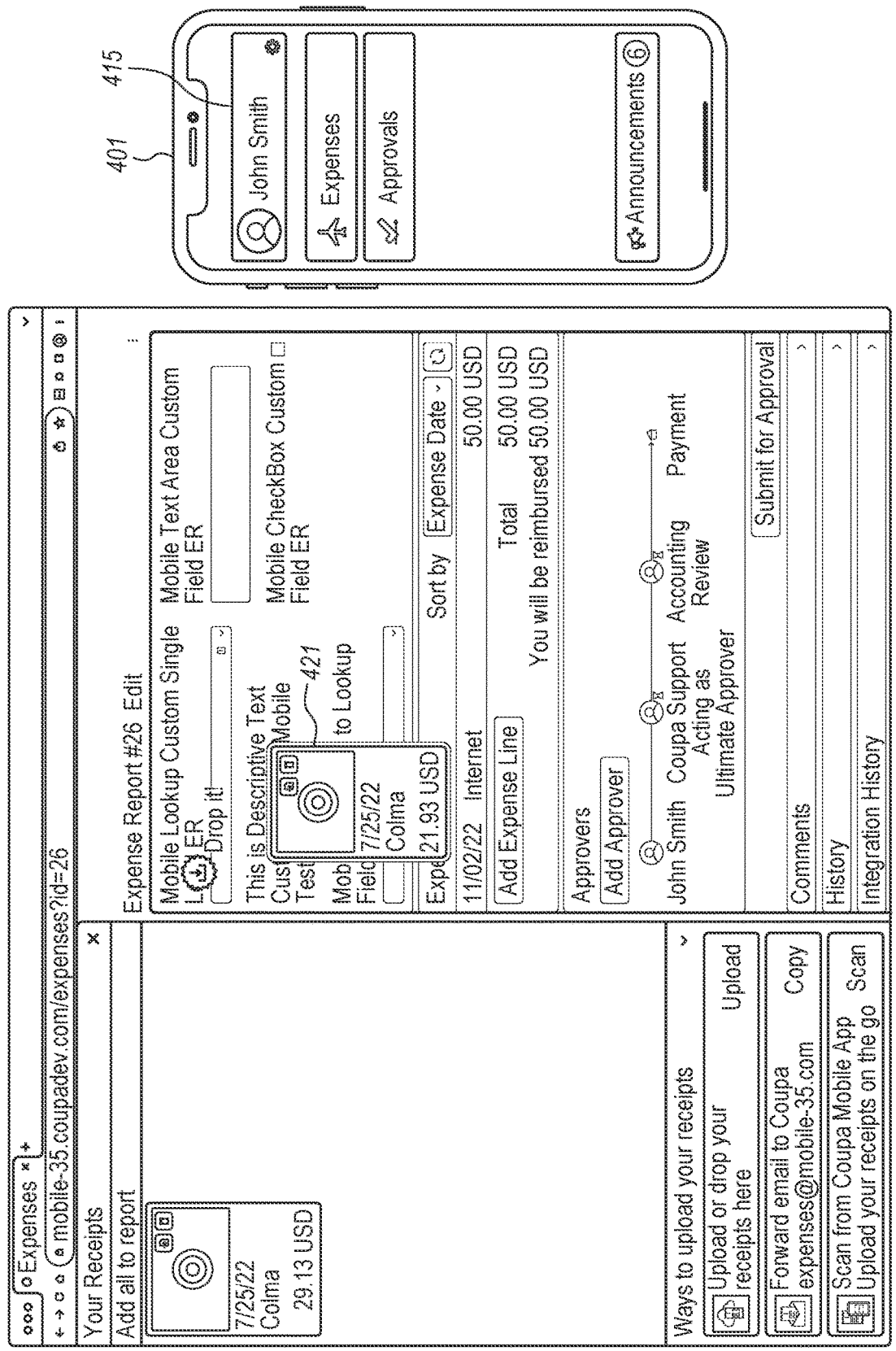
FIG. 6 illustrates an example graphical user interface for displaying information relating to a delegated expense report.

In one embodiment, images that are transmitted to the computer system 130 may be stored together in a folder associated with the account owner. For example, FIG. 5 shows a folder called "Your Receipts" 312 where the uploaded image 314 is stored. In such an embodiment, the uploaded images may be collected in a folder to allow users to determine how those images should be associated with an expense report. For example, the computer system 130 may be programmed to, by user interaction, attach particular images to a particular expense line of an expense report. FIG. 6 illustrates an example technique that allows a user to click and drag the captured image 421 to the expense line named "Internet."

In another embodiment, images that are transmitted to the computer system 130 may be automatically associated with a particular expense line. For example, the web application may be programmed to allow a user to specify that the uploaded images should be attached to a particular expense line at the beginning of the entire process, for example, at a time corresponding to step 201 shown in FIG. 2A. In such an embodiment, once an image is uploaded via the techniques disclosed herein, the computer system 130 may be programmed to attach the uploaded image automatically to the appropriate expense line, such as the "Internet" expense line shown in FIG. 6.

In an embodiment, images that are received by the computer system 130 may be analyzed, and information shown in the images may be extracted and collected. For example, FIG. 6 shows the information extracted from the received image: the date of purchase (for example, "7/25/22"), name of merchant ("Colma"), and amount of the purchase ("29.13 USD").

In an embodiment, when an image has been uploaded to the computer system 130 and has been associated with an expense line, the web application may be programmed to automatically populate the details of the expense item based on information extracted from the image. Thereafter, the web application may be programmed to allow a user to confirm, modify, or add additional details to the expense line. An example of such additional details includes those illustrated in FIG. 7, which includes, among others, "Expense Category."

Figure 7:
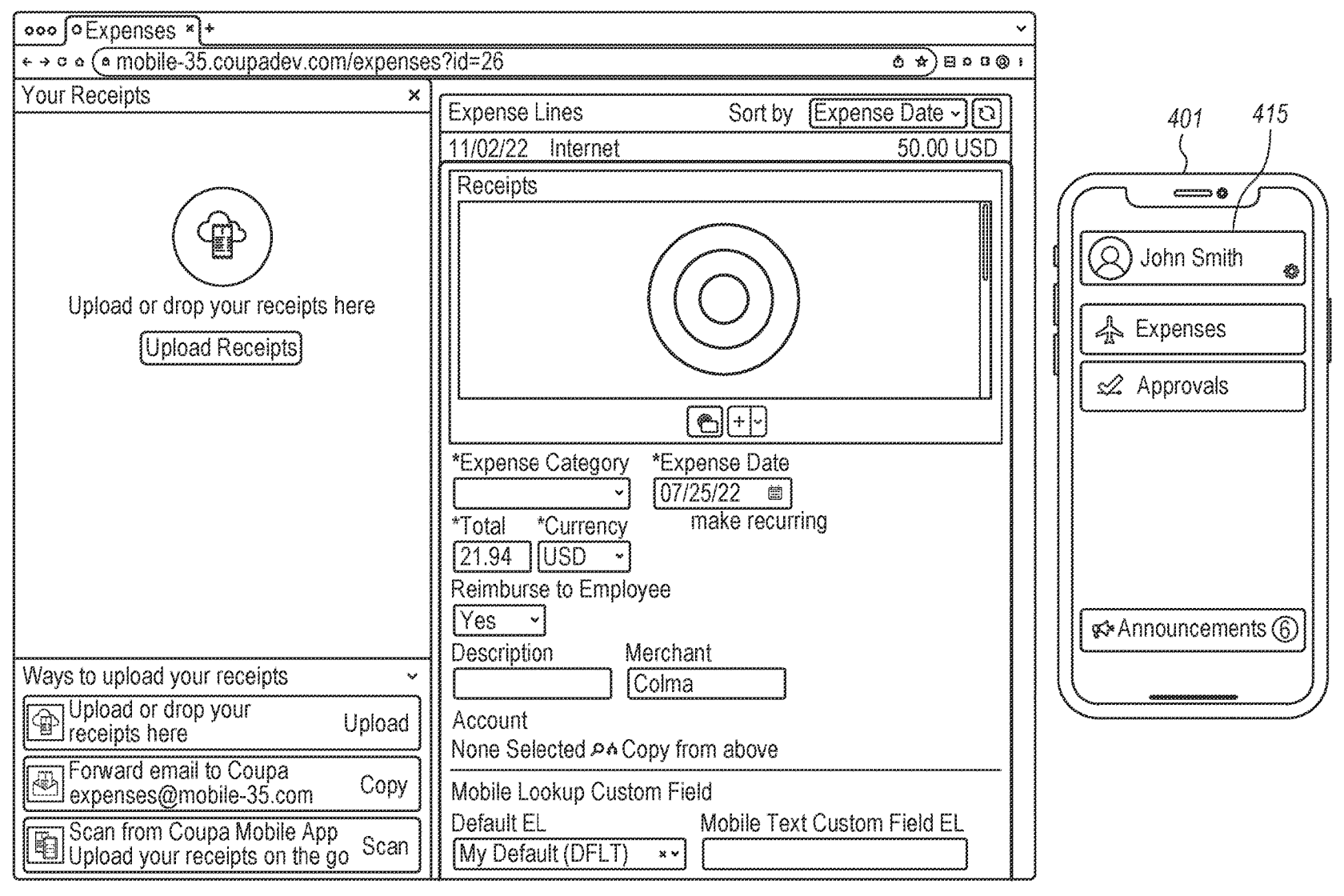

In an embodiment, the mobile application on which the delegate user account is logged-into may comprise a setting that specifies to which user account the captured images may be transmitted to. For example, FIGS. 6 and 7 illustrate a mobile application of the mobile device 401 on which the delegate user account is logged-into, and further illustrate that a user account belonging to "John Smith" has been selected, meaning that images captured and transmitted to the computer system 130 will be sent to John Smith's user account. However, to be clear, in the embodiments shown in these figures, it is the delegate user that is logged-in to the mobile application, which is a different user account than those corresponding to John Smith's. In an embodiment, the web application may be programmed to allow the delegate user account to select other user accounts to which the delegate user account has been authorized to prepare, modify, and submit expense reports for. For instance, if the delegate user wants to upload additional images of receipt for a different user account, the delegate user may change the setting so a different user account is selected, thereafter allowing the delegate user to upload images of receipts using the methods disclosed herein.

In an embodiment, when the expense report has been filled out appropriately, including one or more expense items, the web application may display a button for submitting the expense report to the appropriate approvers. And if the expense report is approved, the account owner may be reimbursed for one or more expense items depending on what and how much of each expense item was approved by the appropriate approvers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
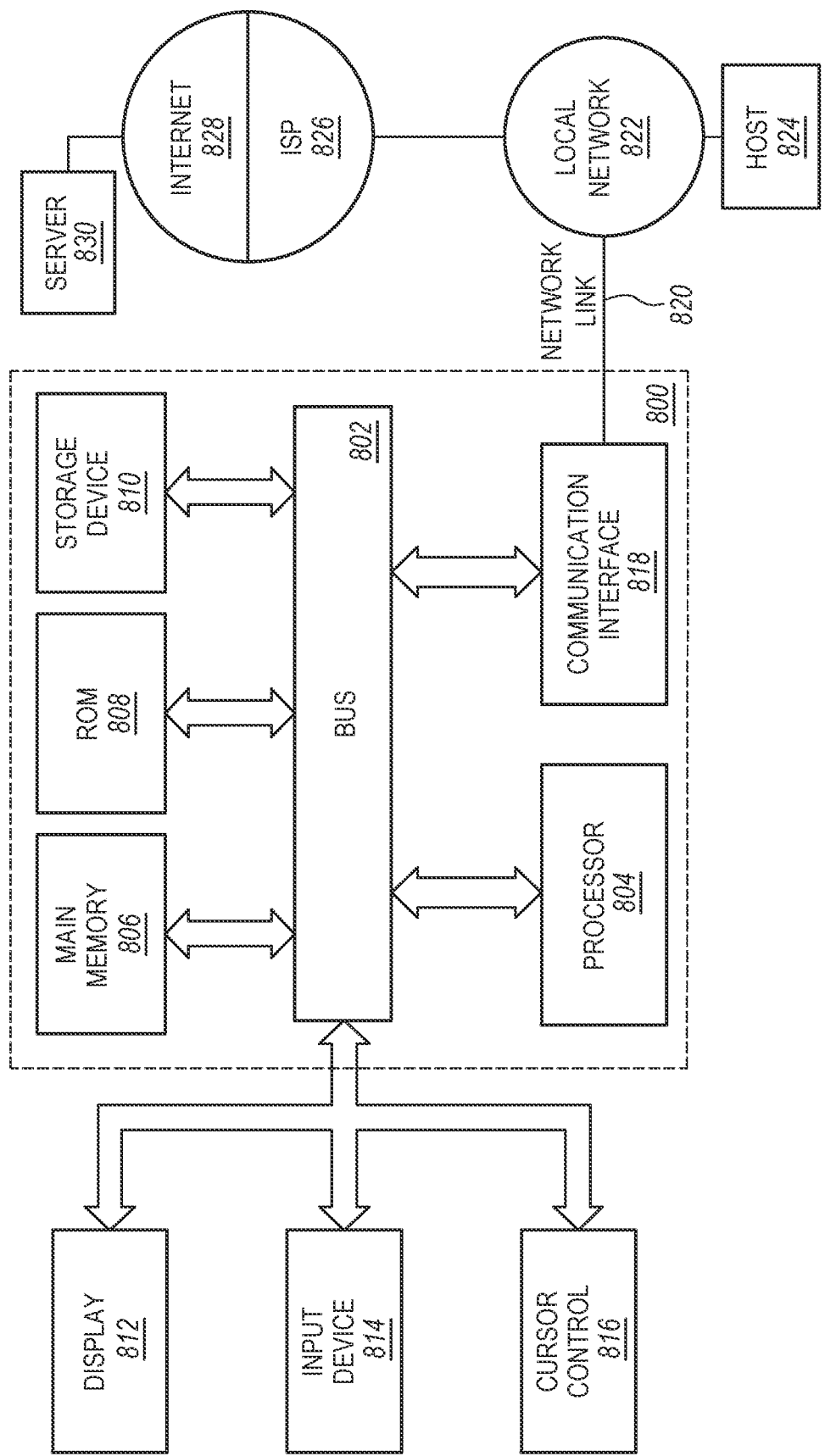
FIG. 8 is a block diagram that illustrates a computer system upon which an embodiment of the disclosure may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method executed using a computer system, the method comprising:
receiving an instruction message from a computing device associated with a first user account, the instruction message specifying that a second user account is a delegate that is authorized to administer an expense record of the first user account on behalf of the first user account;
receiving, from a first device executing an instance of a web application to which the second user account is logged-in to as a delegate of the first user account, a request message to upload an expense image and associating the expense image to an expense line of the expense record of the first user account, the request message requesting the expense image to be uploaded by a second device associated with the second user account on behalf of the first user account without accessing the first user account;
determining that the second user account is an authorized user account to act on behalf of the first user account;
transmitting a notification message to the second-device executing an instance of a mobile application to which the second user account is logged-in;
initiating the second device for auto-capturing and uploading the expense image via the mobile application in response to an instruction from the web application of the first device;
automatically attaching the expense image to the expense line via the web application;
updating the expense line of the expense record associated with the first user account based on the expense image that is auto-captured and uploaded via the mobile application to which the second user account is logged-in to; and
automatically processing expenses corresponding to the expense line by the first device without accessing the first user account by the second user account.

2. The method of claim 1, the method further comprising determining that the second user account is authorized to administer the expense record report of the first user account using the mobile application on which the second user account is logged-into.

3. The method of claim 1, the notification message being formatted to cause the second device to access the mobile application and prompt the second device to upload the expense image of a document.

4. The method of claim 1, the notification message being formatted to cause the second device to access a camera of the second device and prompt the second device to capture the expense image of a document using the camera.

5. The method of claim 1, further comprising analyzing and extracting information included in the expense image.

6. The method of claim 5, the updating the expense line of the expense record comprising modifying the expense line to include the extracted information.

7. The method of claim 5, the information indicating one or more of a merchant name or a merchant identifier; a description of the expense line; a category of expense type; a time or date associated with the expense line.

8. A computer system comprising:
one or more processors:
one or more non-transitory computer-readable storage media coupled to the one or more processors and storing one or more sequences of instructions, which, when executed by the one or more processors, cause the one or more processors to execute:
receiving an instruction message from a computing device associated with a first user account, the instruction message specifying that a second user account is a delegate that is authorized to administer an expense record of the first user account on behalf of the first user account;

receiving, from a first device executing an instance of a web application to which the second user account is logged-in to as a delegate of the first user account, a request message to upload an expense image and associating the expense image to an expense line of the expense record of the first user account, the request message requesting the expense image to be uploaded by a second device associated with the second user account on behalf of the first user account without accessing the first user account;

determining that the second user account is an authorized user account to act on behalf of the first user account;

transmitting a notification message to the second device executing an instance of a mobile application to which the second user account is logged-in;

initiating the second device for auto-capturing and uploading the expense image via the mobile application in response to an instruction from the web application of the first device;

automatically attaching the expense image to the expense line via the web application;

updating the expense line of the expense record associated with the first user account based on the expense image that is auto-captured and uploaded via the mobile application to which the second user account is logged-in to; and automatically processing expenses corresponding to the expense line by the first device without accessing the first user account by the second user account.

9. The computer system of claim 8, the one or more processors being configured to execute:

determining that the second user account is authorized to administer the expense record of the first user account using the mobile application on which the second user account is logged-into.

10. The computer system of claim 8, the notification message being formatted to cause the second device to access the mobile application and prompt the second device to upload the expense image of a document.

11. The computer system of claim 8, the notification message being formatted to cause the second device to access a camera of the second device and prompt the second device to capture the expense image of a document using the camera.

12. The computer system of claim 8, the one or more processors being configured to execute analyzing and extracting information included in the expense image.

13. The computer system of claim 12, the updating the expense line of the expense record comprising modifying the expense line to include the extracted information.

14. The computer system of claim 12, the information indicating one or more of a merchant name or a merchant identifier; a description of the expense line; a category of expense type; a time or date associated with the expense line.

15. One or more computer-readable non-transitory storage media including instructions that, when executed by one or more processors, are configured to cause the one or more processors to execute:

receiving an instruction message from a computing device associated with a first user account, the instruction message specifying that a second user account is a delegate that is authorized to administer an expense record of the first user account on behalf of the first user account;

receiving, from a first device executing an instance of a web application to which the second user account is logged-in to as a delegate of the first user account, a request message to upload an expense image and associating the expense image to an expense line of the expense record of the first user account, the request message requesting the expense image to be uploaded by a second device associated with the second user account on behalf of the first user account without accessing the first user account;

determining that the second user account is an authorized user account to act on behalf of the first user account;

transmitting a notification message to the second device executing an instance of a mobile application to which the second user account is logged-in;

initiating the second device for auto-capturing and uploading the expense image via the mobile application in response to an instruction from the web application of the first device;

automatically attaching the expense image to the expense line via the web application;

updating the expense line of the expense record associated with the first user account based on the expense image that is auto-captured and uploaded via the mobile application to which the second user account is logged-in to; and automatically processing expenses corresponding to the expense line by the first device without accessing the first user account by the second user account.

16. The one or more computer-readable non-transitory storage media of claim 15, the notification message being formatted to cause the second device to access the mobile application and prompt the second device to upload the expense image of a document.

17. The one or more computer-readable non-transitory storage media of claim 15, the notification message being formatted to cause the second device to access a camera of the second device and prompt the second device to capture the expense image of a document using the camera.

18. The one or more computer-readable non-transitory storage media of claim 15, further comprising analyzing and extracting information included in the expense image.

19. The one or more computer-readable non-transitory storage media of claim 18, the updating the expense line of the expense record comprising modifying the expense line to include the extracted information.

20. The one or more computer-readable non-transitory storage media of claim 18, the information indicating one or more of a merchant name or a merchant identifier; a description of the expense line; a category of expense type; and a time or date associated with the expense line.

21. The method of claim 1, wherein the attaching on the first device comprises clicking the expense image and dragging the expense image into the expense line.

* * * * *